(12) United States Patent
Fukushi

(10) Patent No.: US 8,179,107 B2
(45) Date of Patent: May 15, 2012

(54) POWER SUPPLY CIRCUIT AND ELECTRONIC EQUIPMENT

(75) Inventor: Iwao Fukushi, Oizumi-machi (JP)

(73) Assignees: Semiconductor Components Industries, LLC, Phoeniz, AZ (US); Sanyo Semiconductor Co., Ltd., Gunma (JP)

( * ) Notice: Subject to any disclaimer, the term of this patent is extended or adjusted under 35 U.S.C. 154(b) by 647 days.

(21) Appl. No.: 12/354,559

(22) Filed: Jan. 15, 2009

(65) Prior Publication Data

US 2009/0322302 A1    Dec. 31, 2009

(30) Foreign Application Priority Data

Jan. 24, 2008  (JP) ................................. 2008-013872

(51) Int. Cl.
*G05F 1/40* (2006.01)
(52) U.S. Cl. .................... 323/274; 323/284; 361/93.9
(58) Field of Classification Search .......... 323/274–277, 323/282–285; 361/93.9
See application file for complete search history.

(56) References Cited

U.S. PATENT DOCUMENTS

| 5,375,029 | A  | * | 12/1994 | Fukunaga et al. | ............ 361/101 |
| 7,106,037 | B2 | * | 9/2006  | Ohtake et al.   | ................. 323/285 |
| 7,317,355 | B2 | * | 1/2008  | Zhao et al.     | .................... 330/251 |
| 7,379,284 | B2 | * | 5/2008  | Fukushi et al.  | ................. 361/94 |

FOREIGN PATENT DOCUMENTS

JP    2007-006651    1/2007

* cited by examiner

*Primary Examiner* — Jessica Han
(74) *Attorney, Agent, or Firm* — SoCal IP Law Group LLP; Steven C. Sereboff; John E. Gunther

(57) ABSTRACT

A power supply circuit comprising: a voltage generating circuit configured to generate an output voltage of a target level from an input voltage; an overcurrent protection circuit configured to control the voltage generating circuit so as to stop an output current, when a level of the output current generated at a time of generating the output voltage is greater than a reference level; and a reference-level change circuit configured to change the reference level in the overcurrent protection circuit to be at a second level higher than a first level from the first level for a predetermined period, when the overcurrent protection circuit detects that the level of the output current is greater than the reference level.

6 Claims, 4 Drawing Sheets

POWER SUPPLY CIRCUIT AND ELECTRONIC EQUIPMENT

CROSS-REFERENCE TO RELATED APPLICATION

This application claims the benefit of priority to Japanese Patent Application No. 2008-013872, filed Jan. 24, 2008, of which full contents are incorporated herein by reference.

BACKGROUND OF THE INVENTION

1. Field of the Invention

The present invention relates to a power supply circuit and electronic equipment.

2. Description of the Related Art

In power supply circuits, such as a switching regulator, that generates an output voltage of a target level from an input voltage, there is a possibility that due to a short-circuit in a circuit, etc., an output current for a load supplied with the output voltage rises to an excessive level. When a state where the output current thus rises, i.e., an overcurrent state, continues, components making up the power supply circuit and a load may be in danger of being destroyed. Many of the power supply circuits include an overcurrent protection function that an overcurrent state is cancelled by stopping an operation of generating the output voltage when the overcurrent is detected (Japanese Patent Application Laid-open Publication No. 2007-6651, for example).

When the load is driven by using the output voltage generated by the power supply circuit, a state where the output current becomes temporarily large when activating the load, i.e., an inrush current, sometimes occurs. For example, in a case of driving a hard disk drive, the inrush current occurs when activating a motor for rotating the hard disk.

In a case of the power supply circuit including the overcurrent protection function, the operation of generating the output voltage is stopped while the inrush current exceeds an overcurrent detection level. Therefore, in a period during which the operation of generating the output voltage is stopped due to the inrush current, the level of the output voltage is decreased from the target level, and thus, there is a case that the load cannot normally be driven.

SUMMARY OF THE INVENTION

A power supply circuit according to an aspect of the present invention, comprises: a voltage generating circuit configured to generate an output voltage of a target level from an input voltage; an overcurrent protection circuit configured to control the voltage generating circuit so as to stop an output current, when a level of the output current generated at a time of generating the output voltage is greater than a reference level; and a reference-level change circuit configured to change the reference level in the overcurrent protection circuit to be at a second level higher than a first level from the first level for a predetermined period, when the overcurrent protection circuit detects that the level of the output current is greater than the reference level.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
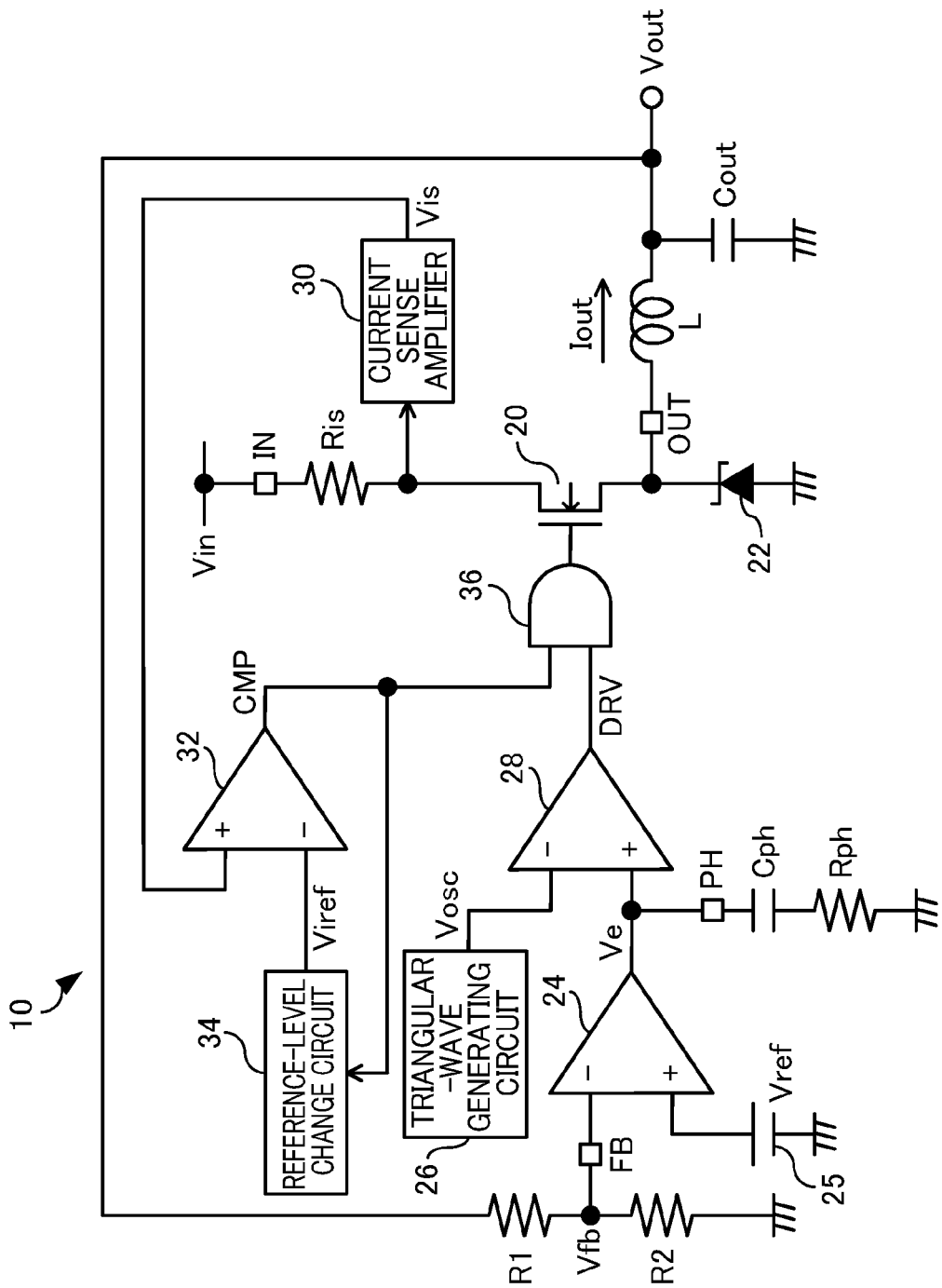
FIG. 1 is a diagram illustrating a configuration of a switching regulator according to an embodiment of the present invention.

FIG. 1 is a diagram illustrating a configuration of a switching regulator according to an embodiment of the present invention. A switching regulator 10 is a power supply circuit that generates from an input voltage Vin an output voltage Vout of a target level to be supplied to a load, and is included in various electronic equipment such as car audio equipment and stereo equipment. For example, the switching regulator 10 is included in car audio equipment having a USB (Universal Serial Bus) terminal, and generates an output voltage Vout, which serves as a drive voltage of a portable hard disk audio player connected via the USB terminal.

The switching regulator 10 includes: an integrated circuit having an N-channel MOSFET 20, a Schottky barrier diode 22, an error amplifier 24, a reference voltage source 25, a triangular-wave generating circuit 26, a comparator 28, a current sense amplifier 30, a comparator 32, a reference-level change circuit 34, and a resistor Ris; a coil L; capacitors Cout and Cph; and resistors R1, R2, and Rph. The N-channel MOSFET 20, the Schottky barrier diode 22, and the resistor Ris can be provided externally of the integrated circuit.

The input voltage Vin, which is applied to an input terminal IN, is applied to a drain of the N-channel MOSFET 20 via the resistor Ris. A source of the N-channel MOSFET 20 is connected to a cathode of the Schottky barrier diode 22, and an anode of the Schottky barrier diode 22 is grounded. A connection point between the N-channel MOSFET 20 and the Schottky barrier diode 22 and an output terminal OUT are connected. One end of the coil L is connected to the output terminal OUT and the other end of the coil L is connected to the capacitor Cout. A voltage output from the capacitor Cout is the output voltage Vout. When the N-channel MOSFET 20 is in an ON state, a current flows from the N-channel MOSFET 20 towards the coil L, and thus, the output voltage Vout gradually rises. When the N-channel MOSFET 20 is changed from the ON state to be turned off, the coil L keeps on passing the current, and thus, the current flows from the Schottky barrier diode 22 towards the coil L, so that the output voltage Vout gradually drops. Therefore, in the switching regulator 10, there is generated the output voltage Vout obtained by dropping the input voltage Vin according to the rate of the N-channel MOSFET 20 being turned on.

A feed back voltage Vfb, which is obtained by dividing the output voltage Vout by the resistors R1 and R2, is applied to a − (minus) input terminal of the error amplifier 24 via a terminal FB. A reference voltage Vref output from the reference voltage source 25 is applied to a + (plus) input terminal of the error amplifier 24. The error amplifier 24 outputs a voltage Ve obtained by amplifying an error between the feedback voltage Vfb and the reference voltage Vref. For phase compensation in a feedback operation of the switching regulator 10, the capacitor Cph and the resistor Rph are connected to an output terminal of the error amplifier 24 via a terminal PH.

The comparator 28 outputs a signal DRV that indicates a comparison result between the voltage Ve, which is output from the error amplifier 24, and a voltage Vosc, which is output from the triangular-wave generating circuit 26, is in a sawtooth shape, and varies with a predetermined frequency, for example. In an embodiment according to the present invention, when the voltage Ve is higher than the voltage Vosc, a signal DRV is at H level, and when the voltage Ve is lower than the voltage Vosc, the signal DRV is at L level.

The signal DRV output from the comparator 28 is ANDed with a signal CMP output from the comparator 32 in an AND circuit 36, to be input to a gate of the N-channel MOSFET 20. Therefore, provided that the signal CMP output from the comparator 32 is at H level, when the signal DRV output from the comparator 28 is at H level, the N-channel MOSFET 20 is turned on, and when the signal DRV is at L level, the N-channel MOSFET 20 is turned off. That is, when the feedback voltage Vfb is lower than the reference voltage Vref, the voltage Ve rises, and thus, the rate increases of H level in the signal DRV output from the comparator 28, so that the output voltage Vout rises. When the feedback voltage Vfb is higher than the reference voltage Vref, the voltage Ve drops, and the rate increases of L level in the signal DRV output from the comparator 28, so that the output voltage Vout drops. Thus, in the switching regulator 10, the N-channel MOSFET 20 is PWM (Pulse Width Modulation) controlled so that the feedback voltage Vfb is equal to the voltage Vref. A circuit including the N-channel MOSFET 20, the Schottky barrier diode 22, the error amplifier 24, the reference voltage source 25, the triangular-wave generating circuit 26, and the comparator 28 corresponds to a voltage generating circuit. However, when the N-channel MOSFET 20 and the Schottky barrier diode 22 are provided externally of the integrated circuit, a circuit excluding components provided externally of the integrated circuit may correspond to the voltage generating circuit.

The current sense amplifier 30 outputs a detection voltage Vis according to a current amount of an output current Iout. In an embodiment according to the present invention, the current sense amplifier 30 amplifies a voltage at a connection point between the resistor Ris and the N-channel MOSFET 20 with a predetermined gain, and then, outputs the amplified voltage. As the output current Iout increases, the amount of a drop in voltage increases at the resistor Ris, the voltage decreases at the connection point between the resistor Ris and the N-channel MOSFET 20, and the detection voltage Vis also decreases. A location where the resistor Ris for detecting the current amount of the output current Iout is disposed, is not restricted to a location illustrated in FIG. 1, and it may be disposed at a location where the output current Iout can be detected, such as a location between the connection point between the N-channel MOSFET 20 and the Schottky barrier diode 22, and the output terminal OUT. Furthermore, without providing the resistor Ris, the current amount of the output current Iout may be detected by an amount of a drop in voltage due to ON-resistance of the N-channel MOSFET 20. Moreover, the current amount of output current Iout may be detected by a capacitor voltage, which changes according to the output current Iout, by connecting a resistor and a capacitor between the output terminal OUT and a ground.

The comparator 32 (comparison circuit) outputs the signal CMP indicating the comparison result between the detection voltage Vis output from the current sense amplifier 30 and the reference voltage Viref output from the reference-level change circuit 34. In an embodiment according to the present invention, when the detection voltage Vis drops to become lower than the reference voltage Viref with increase in the output current Iout, the comparison signal CMP becomes L level. That is, when there is brought about such a state that the output current Iout is greater than the reference level which is in accordance with the reference voltage Viref, i.e., an overcurrent state, the signal CMP is at L level. When the signal CMP is at L level, control is performed such that the signal output from the AND circuit 36 (generation control circuit) is at L level irrespective of the signal DRV output from the comparator 28, the N-channel MOSFET 20 is turned off, and the output current Iout is stopped.

According to the signal CMP output from comparator 32, the reference-level change circuit 34 controls the reference voltage Viref so that an overcurrent detection level is raised during a predetermined period after the time when the overcurrent state is detected.

A circuit including the resistor Ris, the current sense amplifier 30, the comparator 32, the reference-level change circuit 34, and the AND circuit 36 corresponds to an overcurrent protection circuit. However, when the resistor Ris, etc., are disposed externally of the integrated circuit, a circuit excluding components disposed externally of the integrated circuit may correspond to the overcurrent protection circuit.

Figure 2:
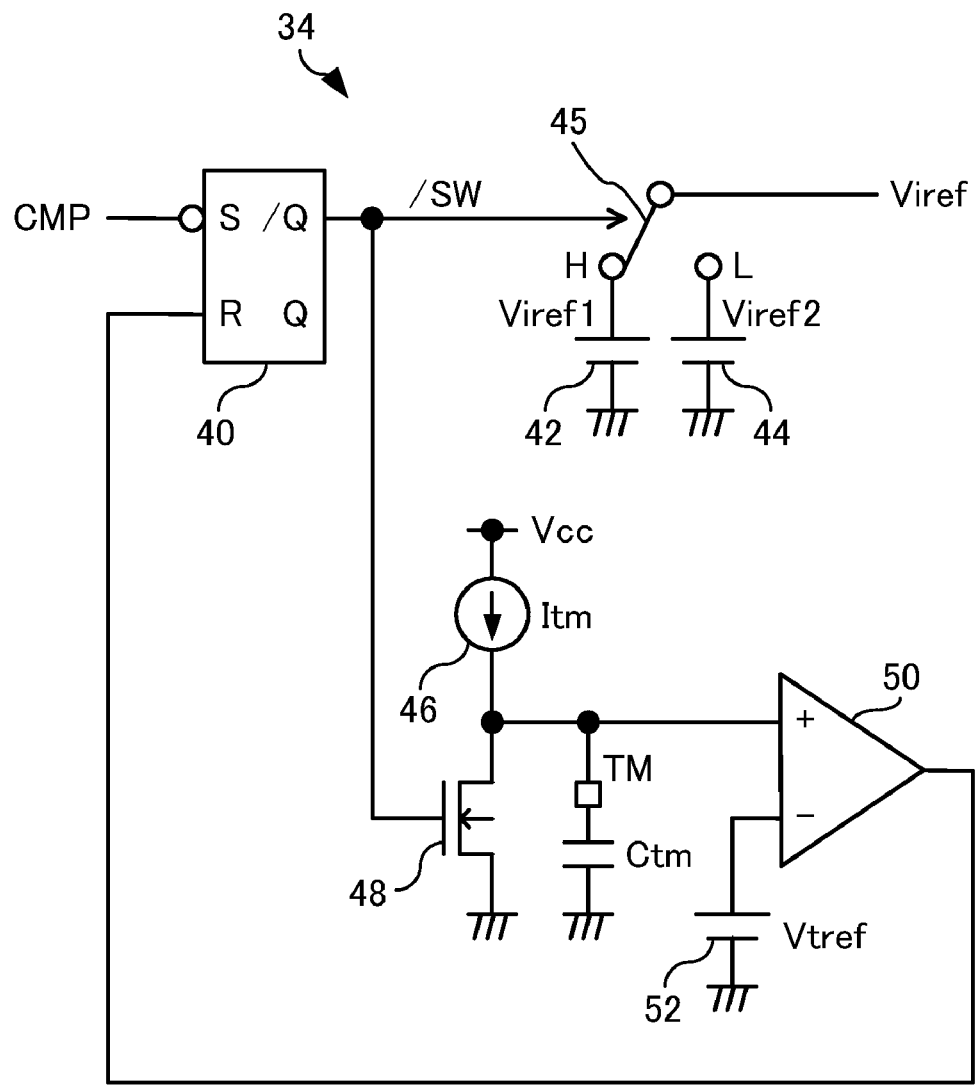
FIG. 2 is a diagram illustrating a configuration example of a reference-level change circuit.

FIG. 2 is a diagram illustrating a configuration example of the reference-level change circuit 34. The reference-level change circuit 34 includes: an SR Flip-Flop (SR-FF) 40; reference voltage sources 42 and 44; a switch 45; a current source 46; an N-channel MOSFET 48; a comparator 50; and a reference voltage source 52.

The signal CMP output from the comparator 32 is inversely input to a set terminal S of the SR-FF 40. A signal output from the comparator 50 is input to a reset terminal R of the SR-FF 40. Therefore, a signal/SW output from an inverse output terminal/Q of the SR-FF 40 is changed to L level when the signal CMP is changed to L level, and the signal/SW is changed to H level when the signal output from the comparator 50 is changed to H level. In an initial state, the signal/SW output from the inverse output terminal/Q of the SR-FF 40 is at H level.

The switch 45 (reference-voltage control circuit) outputs a voltage Viref1 output from the reference voltage source 42 as a reference voltage Viref when the signal/SW output from the inverse output terminal/Q of the SR-FF 40 is at H level, and outputs a voltage Viref2 output from the reference voltage source 44 as the reference voltage Viref2 when the signal/SW is L level. The voltage Viref1 (first reference voltage) is a voltage equal to the detection voltage Vis in a case where the output current Iout is 3A (first level), and the voltage Viref2 (second reference voltage) is a voltage equal to the detection voltage Vis in a case where the output current Iout is 6A (second level) for example. In an embodiment according to the present invention, with increase in the output current Iout, the detection voltage Vis decreases, and thus, the voltage Viref2 is a voltage lower than the voltage Viref1.

The current source 46 is a circuit that generates a constant current Itm. The N-channel MOSFET 48 has a drain which is connected to the current source 46, a source which is grounded, and a gate to which the signal/SW output from the inverse output terminal/Q of the SR-FF 40 is input. A drain of the N-channel MOSFET 48 is connected to the capacitor Ctm via a terminal TM. Therefore, when the signal/SW is at H level, the N-channel MOSFET 48 is turned on, and thus, the capacitor Ctm is in a discharged state. However, when the signal/SW is at L level, the N-channel MOSFET 48 is turned off, and thus, the capacitor Ctm is charged by the constant current Itm. The comparator 50 outputs the comparison result between a voltage of the capacitor Ctm and the reference voltage Vref output from the reference voltage source 52. In an embodiment according to the present invention, when the voltage of the capacitor Ctm is lower than the reference voltage Vtref, a signal output from the comparator 50 is at L level, and when the voltage of the capacitor Ctm is higher than the reference voltage Vtref, a signal output from the capacitor 50 is at H level. That is, the signal output from the comparator 50 is changed to H level when a predetermined period has elapsed after the signal CMP is changed to L level. A circuit including the current source 46, the N-channel MOSFET 48, the comparator 50, and the reference voltage source 52 corresponds to a timer circuit.

Figure 3:
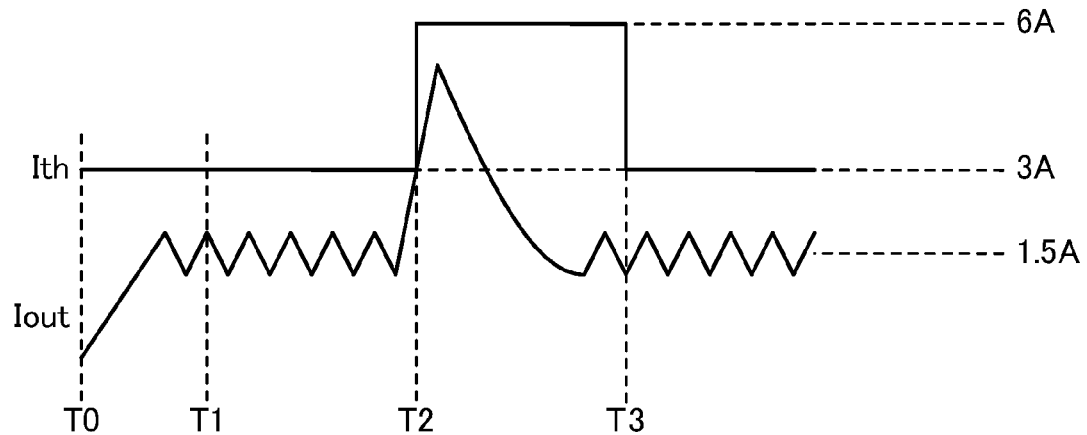
FIG. 3 is a diagram illustrating one example of changes in an output current Iout and an overcurrent detection level Ith.

An operation of the switching regulator 10 will be described. FIG. 3 is a diagram showing one example of changes in the output current Iout and the overcurrent detection level Ith. When the reference voltage Viref is Viref1, the overcurrent detection level Ith is 3A, and when the reference voltage Viref is Viref2, the overcurrent detection level Ith is 6A.

When the switching regulator 10 is activated (at time T0), a switching operation of the N-channel MOSFET 20 is started so that the output voltage Vout becomes the target level, and the output current Iout also starts to rise. At this time, the signal/SW output from the inverse output terminal/Q of the SR-FF 40 is at H level, and the reference voltage Viref output from the reference-level change circuit 34 is Viref1. That is, the overcurrent detection level Ith is 3A. In a state where the output voltage Vout reaches the target level and is stable(at time T1), the output current Iout is maintained at about 1.5 A, for example, although there is a minute change caused by the switching of the N-channel MOSFET 20.

Thereafter, when a portable hard disk audio player which is supplied with the output voltage Vout, is connected, for example, the inrush current occurs when activating a motor for rotating the hard disk. When the output current Iout exceeds 3A, which is the overcurrent detection level Ith, due to the inrush current (at time T2), the signal CMP output from the comparator 32 is changed to L level, and the N-channel MOSFET 20 is forcibly turned off, which is, an overcurrent protection state. However, when the signal CMP output from the comparator 32 is changed to L level, the SR-FF 40 is set, so that the signal/SW is changed to L level. As a result, the reference voltage Viref is switched to Viref2 and the overcurrent detection level Ith rises to 6A. Therefore, unless the output current Iout exceeds 6A, the signal CMP output from the comparator 32 returns to H level, and the switching operation is resumed. When the output current Iout exceeds 6A, the overcurrent protection state is continued.

When the signal/SW is changed to L level, the N-channel MOSFET 48 is turned off and the voltage of the capacitor Ctm starts to rise. When the voltage of the capacitor Ctm exceeds the reference voltage Vtref, the signal output from the comparator 50 is changed to H level and the SR-FF 40 is reset. As the result of the SR-FF 40 being reset, the signal/SW is changed to H level, the reference voltage Viref is switched to the reference voltage Viref1 output from the reference voltage source 42, and the overcurrent detection level Ith returns to 3A (at time T3).

That is, in the switching regulator 10, when the overcurrent is detected, the overcurrent detection level is increased to 6 A from 3 A, for example, for a predetermined period (between T2 and T3, for example). Therefore, assuming that a lower overcurrent detection level is 3 A and a higher overcurrent detection level is 6 A, in the case where the inrush current of about 5 A occurs, for example, the overcurrent protection state is brought about when the output current Iout exceeds 3 A for the first time. However, when the overcurrent detection level is changed to 6 A, the overcurrent protection level is released. Thus, the output voltage Vout can be restrained from decreasing. Since the inrush current is temporary, there is a high possibility that when the overcurrent detection level is returned to 3 A after an elapse of a predetermined period, the inrush current is suppressed and the output current Iout is decreased to become smaller than 3 A. Thus, there is continued a state where the overcurrent protection is released.

Although the detection voltage Vis decreases with increase in the output current Iout in the switching regulator 10, a configuration can be made such that the detection voltage Vis increases with increase in the output current Iout. In this case, for example, the reference-level change circuit 34 can be configured such that the reference voltage Viref is raised for a predetermined period after the overcurrent is detected, the detection voltage Vis can be applied to the − input terminal of the comparator 32, and the reference voltage Viref can be applied to the + input terminal of the comparator 32.

Moreover, the overcurrent detection level may be changed by changing a gain of the current sense amplifier 30 rather than by changing the reference voltage Viref. In this case, the resistor Ris and the current sense amplifier 30 correspond to the current detection circuit. The SR-FF 40, the current source 46, the N-channel MOSFET 48, the comparator 50, the reference voltage source 52, and the N-channel MOSFET 60 are correspond to the reference-level change circuit.

Figure 4:
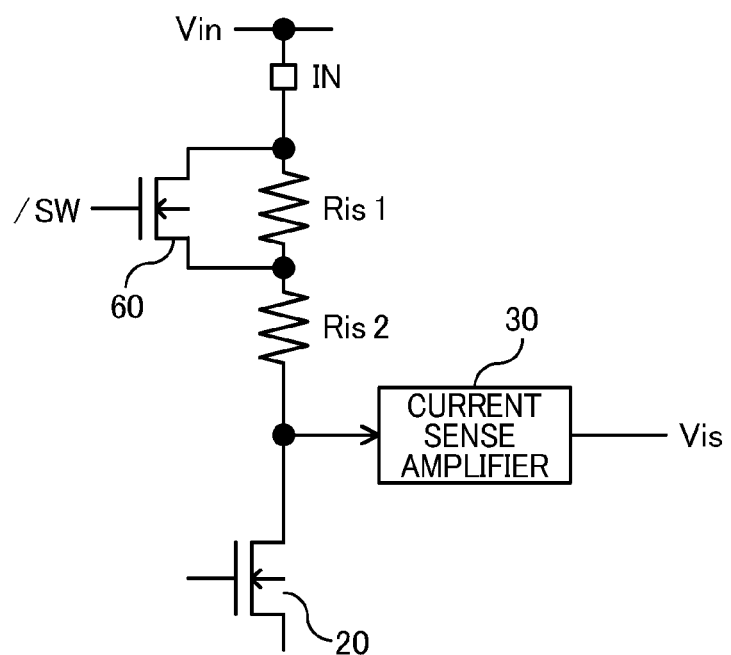
FIG. 4 is a diagram illustrating one example of a configuration in which a resistance value is switched of a resistor for detecting an output current Iout.

Likewise, the overcurrent detection level may be changed by switching a resistance value of a resistor for detecting the current amount of the output current Iout rather than changing the reference voltage Viref. For example, as shown in FIG. 4, a configuration can be made such that resistors Ris1, Ris2, and an N-channel MOSFET 60 are provided instead of the resistor Ris. In a case of the configuration shown in FIG. 4, in an initial state, i.e., in a state where the signal SW (signal of a reverse polarity of the signal/SW) output from the output terminal Q of the signal SR-FF 40 is at L level, the N-channel MOSFET 60 is turned off and the detection voltage Vis in accordance with a drop in voltage by the resistors Ris1 and Ris2 is output. On the other hand, when the overcurrent is detected and the signal SW is changed to H level, the N-channel MOSFET 60 is turned on and the amount of the drop in voltage becomes small. Therefore, even though the reference voltage Viref is constant, the overcurrent detection level can be changed by changing the amount of the drop in voltage. In the configuration in FIG. 4, the resistors Ris1 and Ris2, and the current sense amplifier 30 correspond to the current detection circuit. The SR-FF 40, the current source 46, the N-channel MOSFET 48, the comparator 50, the reference voltage source 52, and the N-channel MOSFET 60 correspond to the reference-level change circuit. The N-channel MOSFET 60 corresponds to a detected-voltage control circuit.

Figure 5:
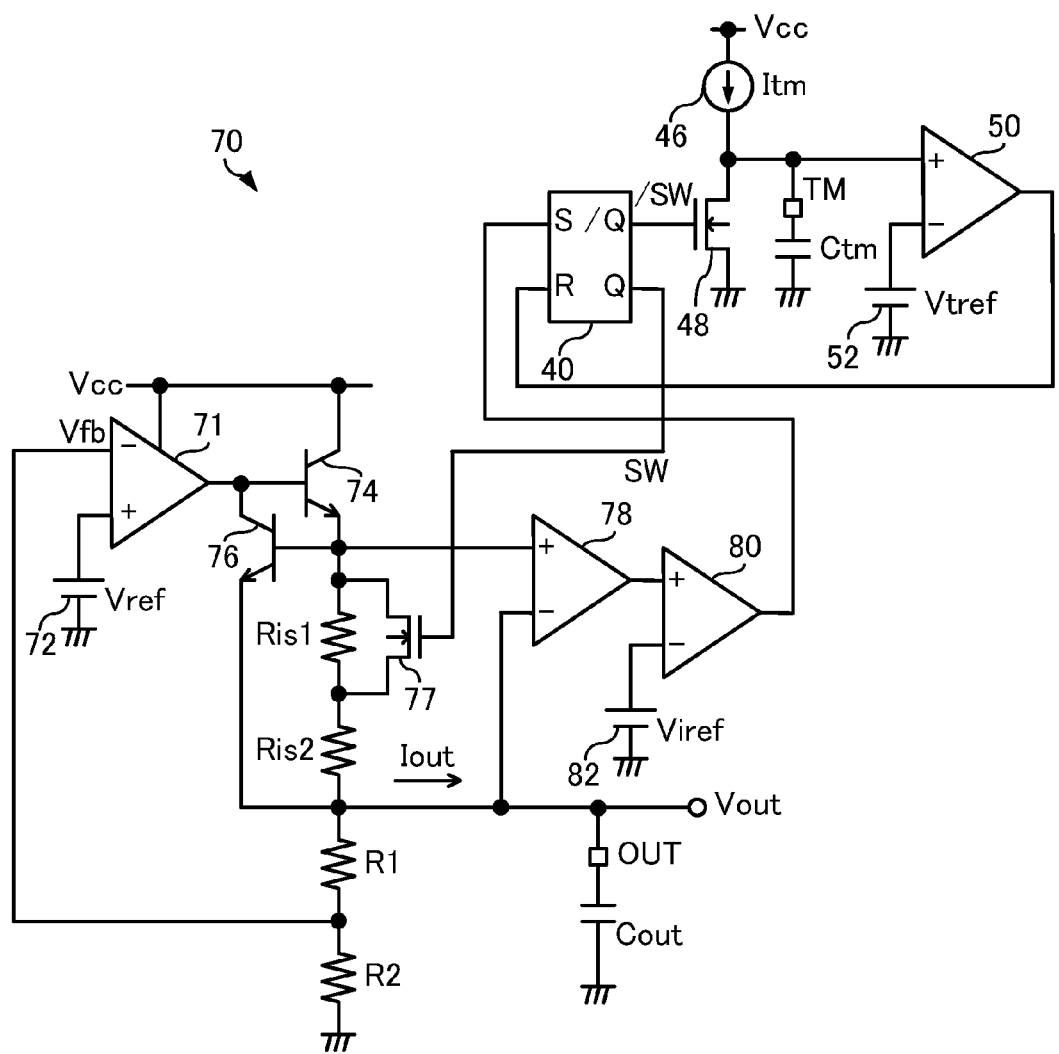
FIG. 5 is a diagram showing a configuration of a series regulator according to another embodiment of the present invention.

FIG. 5 is a diagram showing a configuration of a series regulator which is another embodiment. A series regulator 70, similar to the switching regulator 10, is a power supply circuit for generating the output voltage Vout of the target level to be supplied to the load from an input voltage Vcc, and includes: an operational amplifier 71; a reference voltage source 72; NPN transistors 74 and 76; resistors Ris1, Ris2, R1, and R2; an N-channel MOSFET 77; an error amplifier 78; a comparator 80; and a reference voltage source 82, in addition to the SRF-FF 40, the current source 46, the N-channel MOSFET 48, the comparator 50, and the reference voltage source 52.

The operational amplifier 71 controls the NPN transistor 74 such that the feedback voltage Vfb obtained by dividing the output voltage Vout by the resistors R1 and R2 becomes equal to the reference voltage Vref output from the reference voltage source 72. A circuit including the operational amplifier 71, the reference voltage source 72, and the NPN transistor 74 correspond to the voltage generating circuit according to the present invention.

The NPN transistor 76 and the resistors Ris1 and Ris2 make up the overcurrent protection circuit. A base-to-emitter voltage of the NPN transistor 76 is increased by the resistors Ris1 and Ris2 according to the output current Iout. When the base-to-emitter voltage becomes higher than a predetermined threshold-value voltage, the NPN transistor 76 is turned on. Control is made such that when the NPN transistor 76 is turned on, a current output to a base of the NPN transistor 74 is sank into the NPN transistor 76, the NPN transistor 74 is turned off, and the output current Iout is stopped. That is, when the output current Iout becomes an overcurrent according to resistance values of the resistors Ris1 and Ris2, an overcurrent protection state is brought about. When the N-channel MOSFET 77 is turned on, a base-to-emitter resistance value of the NPN transistor 76 becomes small, and thus, the overcurrent detection level is raised. In an embodiment according to the present invention, when the N-channel MOSFET 77 is in an OFF state, the overcurrent detection level is 3 A (first level), and when the N-channel MOSFET 77 is in an ON state, the overcurrent detection level is 6A (second level).

The error amplifier 78 amplifies the base-to-emitter voltage of the NPN transistor 76 and outputs the amplified voltage. The comparator 80 outputs a comparison result between a voltage output from the error amplifier 78 and a reference voltage Viref output from the reference voltage source 82. In an embodiment according to the present invention, a signal output from the comparator 80 is at H level when the voltage output from the error amplifier 78 is higher than the reference voltage Viref, and is at L level when the voltage output from the error amplifier 78 is lower than the reference voltage Viref. The reference voltage Viref is a voltage that is output from the error amplifier 78 when the output current Iout is at a level (first level) at which the overcurrent is detected in a state of the N-channel MOSFET 77 being turned off. That is, in an embodiment according to the present invention, the reference voltage Viref is a voltage that is output from the error amplifier 78 when the output current Iout is 3 A in a state of the N-channel MOSFET 77 being turned off.

An operation of the series regulator 70 will be described. When the series regulator 70 is activated, the operational amplifier 71 starts an operation so that the output voltage Vout becomes the targeted level. At this time, the signal SW output from the output terminal Q of the SR-FF 40 is at L level, and thus, the N-channel MOSFET 77 is turned off. That is, the overcurrent detection level is 3 A.

When the inrush current of about 5 A, for example, occurs after the output voltage Vout reaches the target level, so that the output current Iout exceeds 3 A, which is the overcurrent detection level, the NPN transistor 76 is turned on, and the NPN transistor 74 is forcibly turned off, which is the overcurrent protection state. At this time, the signal output from the comparator 80 is changed to H level, the SR-FF 40 is set, the signal SW is changed to H level, and the N-channel MOSFET 77 is turned on. Since the N-channel MOSFET 77 is turned on, the overcurrent detection level is changed from 3 A to 6 A, and thus, when the inrush current is smaller than 6 A, the overcurrent protection is released. When the output current Iout exceeds 6 A, the overcurrent protection state is continued.

When the SR-FF 40 is set, the signal/SW is at L level, the N-channel MOSFET 48 is turned off, and the voltage of the capacitor Ctm starts to rise. When the voltage of the capacitor Ctm exceeds the reference voltage Vtref, the signal output from the capacitor 50 is changed to H level, and thus, the SR-FF 40 is reset. When the SR-FF 40 is reset, the signal SW is changed to L level, the N-channel MOSFET 77 is turned off, and thus, the overcurrent detection level is returned to 3 A.

That is, in the series regulator 70, similar to the switching regulator 10, the overcurrent detection level can be in a high state for a predetermined period after the detection of the overcurrent. As a result, decrease in the output voltage Vout due to the inrush current can be suppressed.

Embodiments according to the present invention have hereinabove been described. As described above, when the overcurrent is detected, the overcurrent detection level is raised for a predetermined period, and thus, the decrease in the output voltage due to the inrush current can be suppressed while the protection function is enabled against a very large overcurrent caused by a short-circuit, etc. Moreover, since the detection level is not raised unless the output current exceeds an initial low detection level, the overcurrent protection is performed with the low detection level as long as the overcurrent does not occur. As a result, more secure overcurrent protection can be realized as compared to a case where the overcurrent detection level is maintained at a high level all the time.

A configuration in which the overcurrent detection level is changed for a predetermined period as above can be realized by a configuration in which the reference voltage Viref output from the reference-level change circuit 34 is changed for a predetermined period, for example.

In more specific, as illustrated in FIG. 2, a configuration can be made by using: the timer circuit for detecting an elapse of a predetermined period after detection of the overcurrent state; and the switch 45 for switching the reference voltage Viref such that when the overcurrent state is detected, the detection level is raised, and when the elapse of the predetermined period is detected, the detection level is dropped.

Another configuration in which the overcurrent detection level is changed for a predetermined period can be realized by a configuration in which the output level of the detection voltage Vis is controlled while the reference voltage Viref is maintained at a constant level, for example.

In more specific, the overcurrent detection level can be changed, for example, by changing the gain of the current sense amplifier 30 or by changing the resistance value of a resistor for detecting a current amount of the output current Iout.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A power supply circuit comprising:
   a voltage generating circuit configured to generate an output voltage of a target level from an input voltage;
   an overcurrent protection circuit configured to control the voltage generating circuit so as to stop an output current, when a level of the output current generated at a time of generating the output voltage is greater than a reference level; and
   a reference-level change circuit configured to change the reference level in the overcurrent protection circuit to be at a second level higher than a first level from the first level for a predetermined period, when the overcurrent protection circuit detects that the level of the output current is greater than the reference level.

2. The power supply circuit according to claim 1, wherein the overcurrent protection circuit includes:
a comparison circuit configured to output a comparison result between a voltage according to the output current and a reference voltage according to the reference level; and
a generation control circuit configured to control the voltage generating circuit so as to stop the output current when the level of the output current is greater than the reference level based on the comparison result, and wherein
the reference-level change circuit changes the reference voltage in the comparison circuit to be at a second reference voltage according to the second level from a first reference voltage according to the first level for the predetermined period, when the level of the output current is detected being greater than the reference level based on the comparison result.

3. The power supply circuit according to claim 2, wherein the reference-level change circuit includes:
a timer circuit configured to detect that the predetermined period has elapsed after the level of the output current has become greater than the reference level based on the comparison result; and
a reference-voltage control circuit configured to set the reference voltage in the comparison circuit at the first reference voltage until a time when the level of the output current is detected being greater than the reference level based on the comparison result, to set the reference voltage in the comparison circuit at the second reference voltage when the level of the output current is detected being greater than the reference level, and to set the reference voltage in the comparison circuit at the first reference voltage when the timer circuit detects that the predetermined period has elapsed.

4. The power supply circuit according to claim 1, wherein the overcurrent protection circuit includes:
a current detection circuit configured to output a detection voltage according to the output current;
a comparison circuit configured to output a comparison result between the detection voltage and a reference voltage according to the reference level; and
a generation control circuit configured to control the voltage generating circuit so as to stop the output current when the level of the output current is greater than the reference level based on the comparison result, and wherein
when the level of the output current is detected being greater than the reference level based on the comparison result, the reference-level change circuit controls the current detection circuit so as to change the reference level at a time when the level of the output current is greater than the reference level, to be at the second level from the first level for a predetermined period.

5. The power supply circuit according to claim 4, wherein the reference-level change circuit includes:
a timer circuit configured to detect that the predetermined period has elapsed after the level of the output current has become greater than the reference level based on the comparison result; and
a detected-voltage control circuit configured
to control the current detection circuit so that the level of the output current is detected being greater than the reference level when the level of the output current is greater than the first level, until a time when the level of the output current is detected being greater than the reference level based on the comparison result,
to control the current detection circuit so that the level of the output current is detected being greater than the reference level when the level of the output current is greater than the second level, when the level of the output current is detected being greater than the reference level, and
to control the current detection circuit so that the level of the output current is detected being greater than the reference level when the level of the output current is greater than the first level, when the timer circuit detects that the predetermined period has elapsed.

6. Electronic equipment, comprising:
a voltage generating circuit configured to generate an output voltage of a target level from an input voltage;
an overcurrent protection circuit configured to control the voltage generating circuit so as to stop an output current, when a level of the output current to be output at a time of generating the output voltage is greater than a reference level; and
a reference-level change circuit configured to change the reference level in the overcurrent protection circuit to be at a second level higher than the first level from the first level for a predetermined period, when the overcurrent protection circuit detects that the level of the output current is greater than the reference level.

* * * * *